Dec. 8, 1964   R. J. FAESER   3,160,426
PIPE COUPLING HAVING SECONDARY RESILIENT SEAL MEANS
Filed March 13, 1961

INVENTOR.
ROBERT J. FAESER
BY
ATTORNEY

United States Patent Office 3,160,426
Patented Dec. 8, 1964

3,160,426
PIPE COUPLING HAVING SECONDARY
RESILIENT SEAL MEANS
Robert J. Faeser, Glendora, Calif., assignor to Aerojet-General Corporation, Azusa, Calif., a corporation of Ohio
Filed Mar. 13, 1961, Ser. No. 95,260
2 Claims. (Cl. 285—95)

The present invention relates to high pressure pipe line couplings and has for its general object to provide such a coupling free from leakage under any condition.

The coupling is of the type in which the flared end of one pipe is forced against the bevelled end of a fitting by a coupling nut. Packing elements have been incorporated in the assembly to provide a secondary seal in the event of a failure of the flared tube seal.

The flare or bell mouth on the tube end should, of course, exactly fit the bevel on the end of the fitting, the smallest failure of an exact fit causing leakage. The flared end of the tube of such couplings is highly stressed by the forming operation and in order to secure a tight joint the coupling nut is tightened. This may cause cracks in the flared portion of the tube if there is any slight mismating of the flared portion and bevelled end of the other tube.

Any packing incorporated in such known couplings is subjected to heavy mechanical pressures and may be cracked, thereby failing to prevent leakage.

It is an object of the present invention to provide a tube coupling of the kind described provided with a part serving to back up the flared portion of the one tube, said part being arranged to serve the dual purpose of securing a close fit of the flared end of the tube on the bevelled end of the fitting, and to prevent leakage between said part and the tube on which it is mounted should any leakage take place in the joint.

It is a further object of the invention to provide additional sealing means of resilient material arranged in the coupling free from severe mechanical stresses and from abrasion by the parts of the coupling while it is being made up or taken apart, thus ensuring long life of the sealing means.

Another object is to provide a novel coupling incorporating the features of the invention which comprises a minimum of special parts and is inexpensive to produce but is more effective than high pressure couplings at present in use.

Still further objects and features of the invention will hereinafter appear from the following description and accompanying drawings. By way of example, the novel coupling of the invention is illustrated as applied to a threaded nipple and a tube to be connected thereto, but it will be obvious that the coupling may equally be applied to two pipes or tubes to be connected together in leak proof relation.

With the above-stated and further objects in view, the invention comprises a coupling of the kind described in which a sleeve transmitting pressure from the coupling nut to the flared end of one tube is welded, brazed, or similarly attached to said tube after being stressed against the back of the flared end. A chamber sealing means is positioned at the exterior of a thickened pressure transmitting head of the sleeve and the exterior of the fitting.

Figure 1:
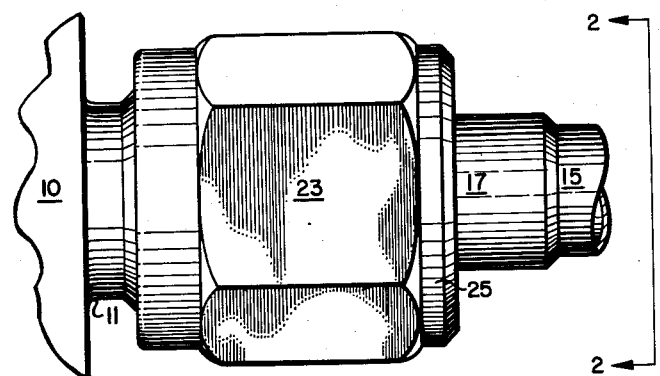
FIG. 1 is a side elevation of the coupling constructed according to the invention as applied to a threaded nipple and a length of tubing secured thereto.
Figure 3:
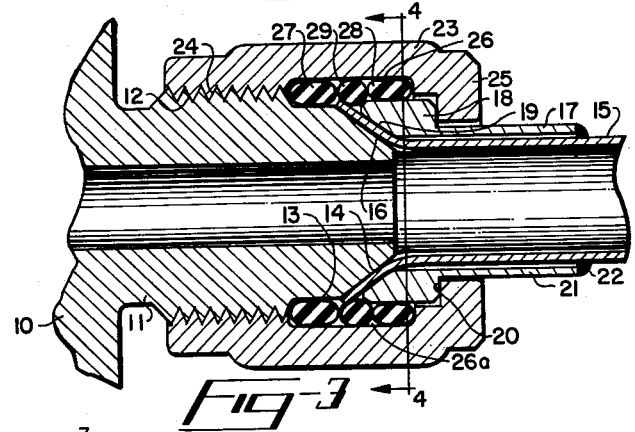
FIG. 3 is a section taken on line 3—3 in FIG. 2.
Figure 2:
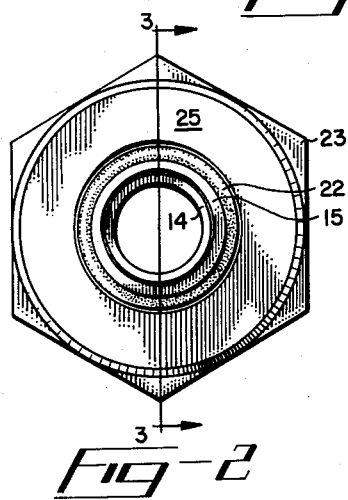
FIG. 2 is a front elevation of the coupling shown in FIG. 1 looking from the right as indicated by the arrows associated with the line 2—2 in FIG. 1.
Figure 4:
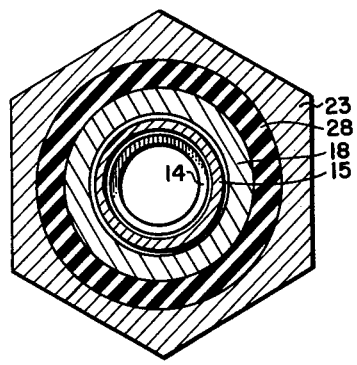
FIG. 4 is a section taken on the line 4—4 in FIG. 3.

Referring now to FIG. 3, the wall of a pressure vessel is indicated at 10 having a threaded nipple 11 extending therefrom. Nipple 11 is threaded as indicated at 12 and provided with a short length 13 of smooth cylindrical surface. The end of the nipple 11 is provided with an inwardly and forwardly tapered or bevelled face 14.

The end of the tube 15 is flared or belled outwardly as indicated at 16, the slope or taper of surfaces 14 and 16 being equal so that they may be brought into engagement over their whole extent.

In order to apply pressure to the flared end 16 of the tube and support it, as well as reinforce this portion of the tube, a sleeve 17 is fitted on tube 15.

The sleeve 17 is formed with a thickened end 18 provided with an inwardly conical bearing face 19 fitting against the back of the flared end 16, and with a peripheral shoulder 20. The other end 21 of the sleeve, after face 19 has been forced against the flared end 16 of tube 15, as later described, is welded around its periphery to the tube 15 as indicated at 22.

The coupling nut 23 is internally threaded at one end as indicated at 24 to engage with the threads 12 formed on the nipple 11, and the opposite end of the nut 23 is formed with an inwardly projecting peripheral flange 25 which engages with shoulder 20 when the coupling nut 23 is tightened up to force the belled or flared end 16 of tube 15 onto the bevelled face 14 of the nipple 11.

The coupling nut 23 is provided with a length of plane surfaced bore 26 extending between the inward end of the threaded portion 24 of the nut 23 and the inwardly projecting flange 25. Bore 26 is preferably of greater diameter than the threaded portion 24. A closed chamber 26a is thus established between the interior of the coupling nut and the pipe joint. O-sealing rings 27 and 28 are positioned in the space between the inner end of the threaded portion 24 and flange 25. Sealing ring 27 will prevent leakage through the threaded portion of the nipple and coupling nut, and sealing ring 28 will prevent any leakage between flange 25 and shoulder 20 should any leakage occur between the bevelled face 14 of the nipple and the bevelled end 16 of tube 15.

It will be evident since no mechanical stresses are imposed on the O ring seals 27 and 28, other than possibly a slight initial compression, the ring seals function with maximum effectiveness and without wear.

As shown in FIG. 3, the length of the smooth surfaced chamber 26a is greater than is required for the O ring seals 27 and 28 and a third O ring seal 29 is positioned between ring seals 27 and 28 to hold them against the ends of the chamber 26a.

In assembling the coupling, the sleeve 17 being in position with its head 18 against the back of the flared end 16, coupling nut 23, without the O ring seals in position, is tightened up on nipple 11 to bring the flared end 16 of pipe 15 into full engagement. Sleeve 17 is then welded around its outer end to the surface to tube or pipe 15. This ensures that should any leakage occur due to the development of a crack in the flare 16, no leakage can take place between the sleeve and surface of tube or pipe 15.

Coupling nut 23 is then backed off nipple 11 and the joint separated sufficiently to enable the O ring seals to be inserted which is done by pushing the flange 25 of the nut against shoulder 20 and working the O rings into position in the smooth portion of the bore of the nut. Coupling nut 23 is then again screwed onto nipple 11 and tightened up. It will be noted that the O rings are not compressed by the tightening up of nut 23.

The coupling constructed according to the invention is simple and inexpensive to construct, involving only minor modifications of standard parts, yet provides a high pressure coupling provided with secondary sealing elements arranged so as to be free from distortion and wear.

The coupling described has been successfully tested to retain without leakage fluid pressures of 3000 p.s.i.

A preferred embodiment of the invention has been described and shown in the accompanying drawings by way of illustrative example and not as limitative of the scope of the invention since various modifications may be made therein by those skilled in the art without departing from the scope of the invention as defined by the appended claims.

I claim:

1. A pipe coupling comprising a first tubular member having a radially outwardly flared end, a second tubular member having a bevelled end complementary to the flared end of said first tubular member and opposed thereto, a sleeve mounted on said first tubular member and having a thickened end provided with a bearing face, said bearing face being seated against the flared end of said first tubular member in complementary relationship on the side thereof opposite from the side opposed to the bevelled end of said second tubular member, said sleeve including a skirt extending from the thickened end in surrounding relation to said first tubular member and fixedly secured thereto in leakproof relation therewith, the thickened end of said sleeve having a radial shoulder on the side thereof opposite from said bearing face, a coupling member encircling said first and second tubular members and being threadably secured at one end thereof to said second tubular member at a position thereon axially spaced from the bevelled end thereof, said coupling member having a radially inturned flange at its other end engaging said radial shoulder on the thickened end of said sleeve to hold the flared end of said first tubular member in sealing engagement with the bevelled end of said second tubular member, the internal surface of said coupling member cooperating with the peripheral surfaces of said second tubular member and the thickened end of said sleeve encircled by said coupling member to define an annular chamber, first and second resilient annular seals in said chamber, said first resilient annular seal engaging the internal surface of said coupling member and the peripheral surface of said second tubular member at one end of said chamber adjacent the threaded securement between said coupling member and said second tubular member, said second resilient annular seal engaging the internal surface of said coupling member and the peripheral surface of the thickened end of said sleeve at the other end of said chamber, and said first and second resilient annular seals being urged axially apart by fluid pressure leakage between the flared end of said first tubular member and the bevelled end of said second tubular member into said chamber to enhance the respective sealing effectiveness of said first and second resilient annular seals at the opposite ends of said chamber.

2. A pipe coupling as set forth in claim 1, further including a positioning member disposed between said first and second resilient annular seals in said chamber and maintaining said first and second resilient annular seals in respective engagement with the peripheral surface of said second tubular member and the peripheral surface of the thickened end of said sleeve so that said first and second resilient annular seals are positioned radially outwardly of the flared end of said first tubular member on opposite sides thereof.

References Cited by the Examiner
UNITED STATES PATENTS

| | | | |
|---|---|---|---|
| 587,347 | 3/97 | Waite | 285—334.5 |
| 1,893,442 | 1/33 | Parker | 285—334.5 |
| 2,090,266 | 8/37 | Parker | 285—334.5 |
| 2,148,746 | 2/39 | Hampe | 285—354 |
| 2,290,890 | 7/42 | Parker | 285—334.5 |
| 2,391,266 | 12/45 | Parker | 285—334.5 |
| 2,428,143 | 9/47 | Chavayda | 285—351 |
| 2,438,529 | 3/48 | Woodling | 285—382.5 |
| 2,460,311 | 2/49 | Riley | 285—416 |
| 2,463,196 | 3/49 | Parker | 285—334.5 |
| 2,485,976 | 10/49 | Main. | |
| 3,089,713 | 5/63 | Scaramucci | 285—351 |
| 3,116,944 | 1/64 | Parker | 285—354 |

CARL W. TOMLIN, *Primary Examiner.*

HUNTER C. BOURNE, JR., *Examiner.*